Jan. 6, 1925.　　　　　　　　　　　　　　　　　1,521,916
J. C. TULLOCH
ANTIRATTLER FOR AUTOMOBILE WINDOWS
Filed July 9, 1923　　　　2 Sheets-Sheet 2
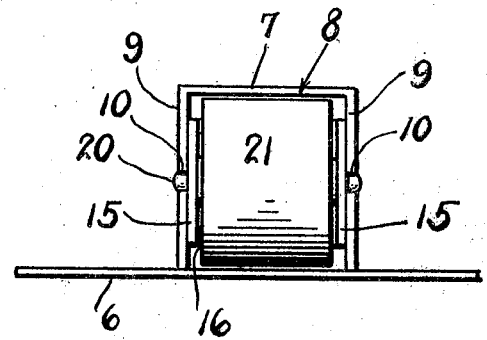
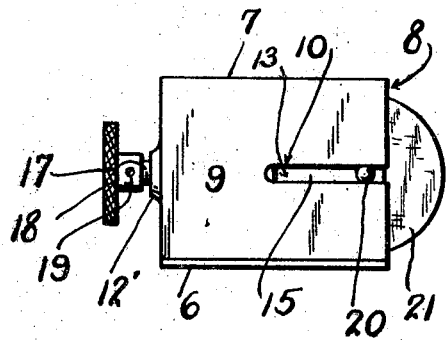
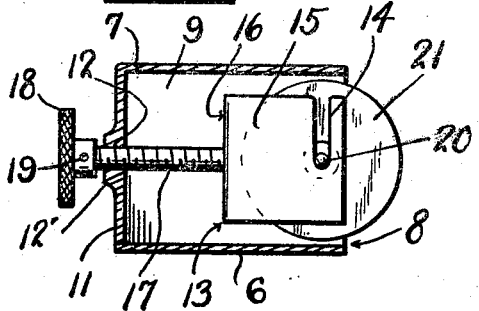
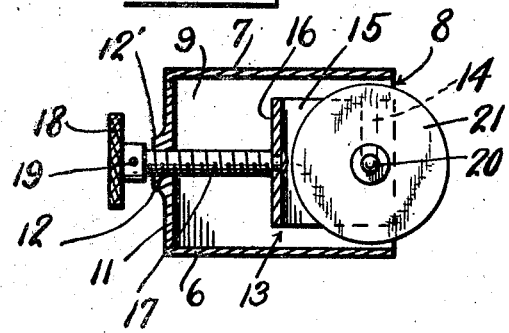
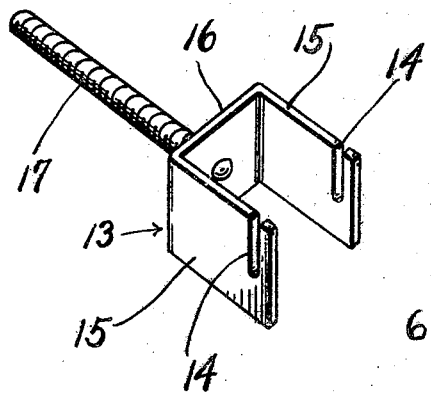
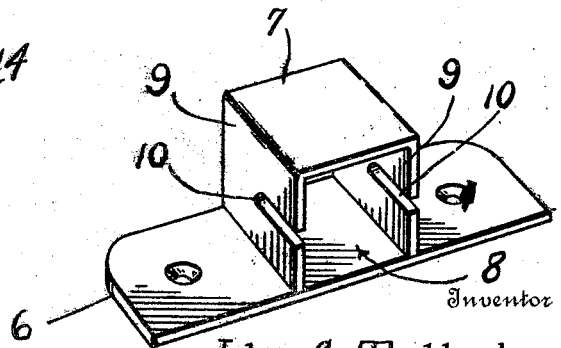
Inventor
John C. Tulloch
By L. B. James
Attorney Patented Jan. 6, 1925.

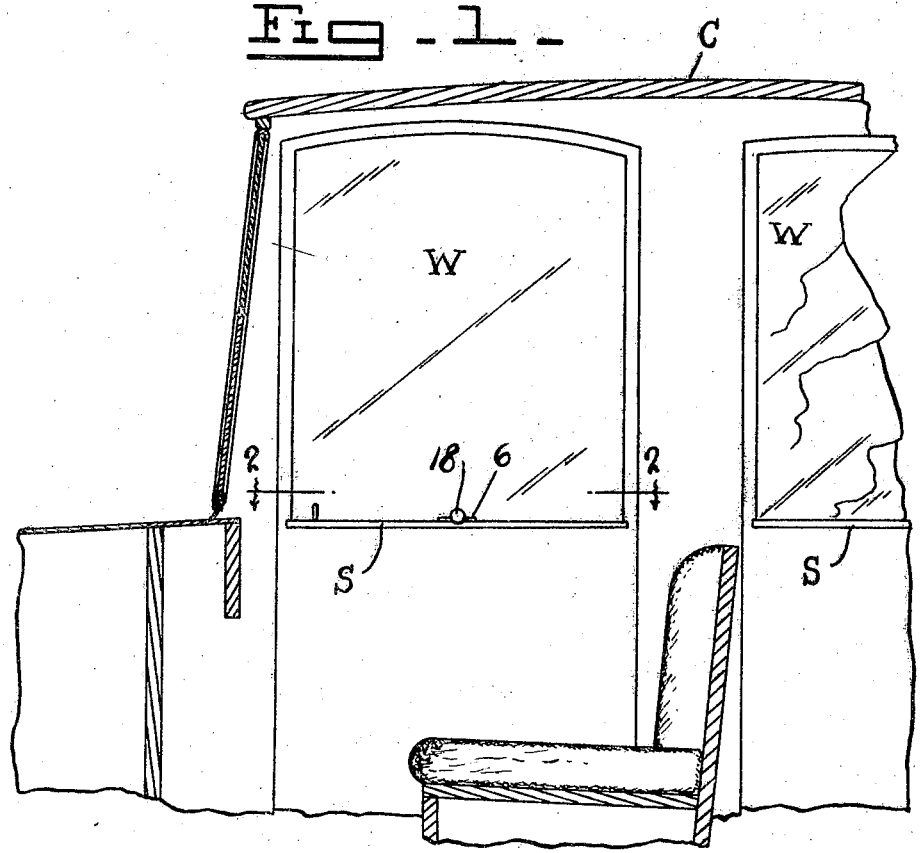
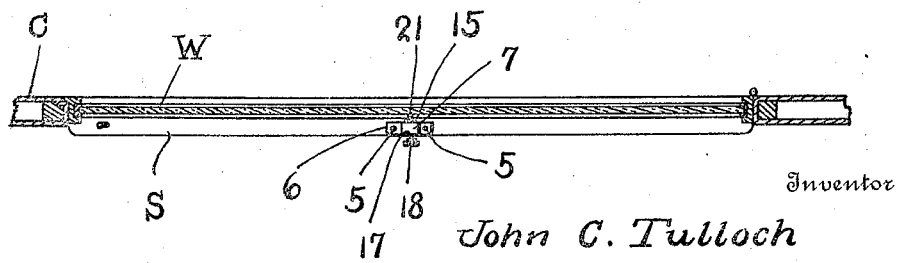

1,521,916

UNITED STATES PATENT OFFICE.

JOHN C. TULLOCH, OF OGDENSBURG, NEW YORK.

ANTIRATTLER FOR AUTOMOBILE WINDOWS.

Application filed July 9, 1923. Serial No. 650,385.

*To all whom it may concern:*

Be it known that I, JOHN C. TULLOCH, a citizen of the United States, residing at Ogdensburg, in the county of St. Lawrence and State of New York, have invented new and useful Improvements in Antirattlers for Automobile Windows, of which the following is a specification.

This invention relates to automobile sundries and more particularly to anti-rattlers for the windows of closed automobiles.

The primary object of this invention resides in the provision of anti-rattlers, for the windows of closed automobiles, which can be manufactured cheaply and readily installed in operative position adjacent the windows without defacing the automobile.

Another object of this invention resides in the provision of anti-rattlers, for the windows of closed automobiles, which can readily be adjusted to eliminate the rattling of the windows regardless of the distance existing between the pane of glass and adjacent sill of the window.

A still further object of this invention resides in the provision of anti-rattlers, for the windows of closed automobiles, consisting of an embodiment of removable elements which can readily be replaced without removing the base from the sill of the automobile window.

A still further object of this invention resides in the provision of anti-rattlers, for the windows of closed automobiles having window contacting elements which can be readily removed from their carriages by simply advancing the carriages beyond the openings provided in the advanced edges of the housings or carriage guides.

With these and other objects in view, this invention resides in certain novel features of construction, combination and arrangement of elements to be hereinafter set forth in the specification, illustrated in the accompanying drawings and pointed out in the appending claims, it being understood that the right is reserved to make such changes in the present disclosure as come within the scope of the claims.

In the accompanying drawings:

Fig. 1 is a conventional illustration of a closed automobile showing a longitudinal sectional view through the same with the elements of this invention disposed in operative position on one of the sills of a window thereof.

Fig. 2 is an enlarged sectional view on line 2—2 of Fig. 1.

Fig. 3 is an enlarged front view of an anti-rattler as constructed in accordance with this invention.

Fig. 4 is a side view thereof.

Fig. 5 is a longitudinal sectional view through the housing or carriage guide with the window engaging element and its carriage in side elevation.

Fig. 6 is a similar view with the window engaging element in side elevation and its carriage in section.

Fig. 7 is a detail perspective view of the carriage for the window engaging element.

Fig. 8 is a detail perspective view of the base and housing or carriage guide carried thereby.

In the present illustration of this invention, the letter C designates a conventional disclosure of a closed automobile having the usual movable windows W and window sills S which are generally made of polished wood.

Secured to the sills S, as by screws 5 or the like, is an apertured base plate 6 having a housing or carriage guide 7 rigidly fixed thereto and disposed to present its open end 8 toward the window with which its associated elements, to be hereinafter described, are to be directed. The side walls 9 of the housing are provided with guide slots 10 which terminate at the outer edges of walls 9 and the rear wall 11 is provided with a threaded aperture 12 having a threaded boss 12' to produce a wide area of threads for a purpose to be hereinafter set forth.

Snugly fitting within the housing 7 is a movable carriage 13 having slots 14 formed in its side walls 15 so that their bases will lie in horizontal alignment with the slots 10 of the housing or carriage guide 7.

Rotatably secured to the rear wall 16 of the carriage 13 is a threaded rod 17 which is adapted to threadedly engage the threaded aperture 12 of the rear wall 11 of the housing or carriage guide 7 and extend exteriorly of said rear wall 11 to receive a thumb-knob 18 that is removably secured to the outer end of the rod 17 by a set-screw 19 or other suitable element.

Carried by the carriage 13 through the instrumentality of studs or trunnions 20 is a window contacting element 21 which, in this instance, is preferably in the form of a roller formed from pliable material such as rubber or felt.

In order to mount the roller or window contacting element 21 on the carriage and dispose it in operative position, the thumb-knob of the threaded rod 17 is removed and the carriage is directed beyond the open end of the housing or carriage guide 7, a sufficient distance to receive the trunnions 20 in the slots 14, whereupon the threaded rod is retracted until the trunnions enter the slots 10, then the thumb-knob 18 is secured to the protruding end of the threaded rod to permit it to be rotated so the roller can readily be advanced or adjusted toward and from the window upon which it is to operate.

In order to produce an article of this character which can be applied to automobiles of various makes, wherein the sills vary in distance from the windows, the threaded rods 17 are manufactured in excessive lengths and may be cut off to facilitate the proper adjustment of the window contacting elements.

Having fully described this invention what I claim and desire to protect by Letters Patent is:

1. An anti-rattler of the character set forth, comprising a housing having an open end and opposed slots in its side walls terminating at the edges of the open end, a carriage having opposed slots in its side walls, said slots being disposed at right angles to those in the walls of the housing and terminating at the edges of the side walls of the carriage, a pliable roller, journals on the roller extending through the aforesaid slots of the carriage and housing and adjusting means between the housing and carriage.

2. An anti-rattler of the character set forth, comprising a housing having an open end and opposed slots in its side walls, a carriage having opposed slots in its side walls, said slots being disposed at right angles to those in the walls of the housing, a pliable roller, journals on the roller extending through the aforesaid slots of the carriage and housing, and adjusting means between the housing and carriage.

In testimony whereof I affix my signature.

JOHN C. TULLOCH.